(12) United States Patent
Davies et al.

(10) Patent No.: US 6,676,750 B1
(45) Date of Patent: Jan. 13, 2004

(54) GROWTH OF DIAMOND CLUSTERS

(76) Inventors: Geoffrey John Davies, 36 Boundary Road, Linden Extension, 2194, Randburg (ZA); Raymond Albert Chapman, 183 Columbine Avenue, Mondeor, 2091 (ZA); Lesley Kay Hedges, 4 Oriole Mews, Delphinium Street, Brackenhurst, 1448 (ZA); Aulette Stewart, 22 Nicolyn Avenue, Ruiterhof, 2194, Randburg (ZA)

( * ) Notice: Subject to any disclaimer, the term of this patent is extended or adjusted under 35 U.S.C. 154(b) by 0 days.

(21) Appl. No.: 10/089,921
(22) PCT Filed: Oct. 4, 2000
(86) PCT No.: PCT/IB00/01415
§ 371 (c)(1),
(2), (4) Date: Aug. 1, 2002
(87) PCT Pub. No.: WO01/24920
PCT Pub. Date: Apr. 12, 2001

(30) Foreign Application Priority Data

Oct. 5, 1999 (ZA) .................................................. 996318
Nov. 19, 1999 (ZA) .................................................. 997208

(51) Int. Cl.⁷ ............................................. C30B 25/02
(52) U.S. Cl. ......................................... 117/68; 423/446

(58) Field of Search ............................. 117/68; 423/446

(56) References Cited

FOREIGN PATENT DOCUMENTS

| | | |
|---|---|---|
| BE | 759626 | 6/1971 |
| DE | 3612340 A1 | 10/1987 |
| EP | 0780153 A1 | 6/1997 |
| EP | 0 826758 A1 | 3/1998 |

*Primary Examiner*—Felisa Hiteshew
(74) *Attorney, Agent, or Firm*—Scully, Scott, Murphy & Presser (57) ABSTRACT

A diamond cluster includes a core and an overgrown region containing a plurality of diamond crystallites extending outwards from the core, the majority of the crystallites having a cross-sectional area which increases as the distance of the crystallite from the core increases. Generally, at least 80% of the crystallites have a cross-sectional area which increases as the distance of the crystallite from the core increases. Furthermore, a method of producing a plurality of the diamond clusters includes the stops of providing a source of carbon, providing a plurality of growth center particles, each comprising a bonded mass of constituent particles, producing a reaction mass by bringing the carbon source and growth center particles into contact with a solvent/catalyst, subjecting the reaction mass to conditions of elevated temperature and pressure suitable for crystal growth, and recovering a plurality of diamond clusters from the reaction mass.

17 Claims, 6 Drawing Sheets

GROWTH OF DIAMOND CLUSTERS

BACKGROUND OF THE INVENTION

This invention relates to the growth of diamond clusters.

The use of seeds to control crystallisation by controlling the number of nucleation sites is well known in the art of crystal growing. In the case of diamond crystal synthesis, small diamond particles may be used as seeds to promote the domination of crystal growth on the seeds rather than crystal growth by spontaneous nucleation. For such applications, it is desirable to ensure that the seeds have a known size distribution so that numbers of seeds can be controlled, and that the seeds are distributed evenly and discretely.

Generally, in the art of growing diamond crystals by high pressure, high temperature (HPHT) synthesis, the seeds are diamond particles which are non-twinned, single crystals which are selected on the basis of size alone. Such seeds are usually made by crushing larger HPHT synthetic diamond crystals, and the diamonds grown using these seeds are dominated overwhelmingly by non-twinned, single crystals with a cubo-octahedral morphology. In this method of growing diamond crystals, the difference in solubility between graphite and diamond under substantially the same conditions of pressure and temperature is used as the driving force (supersaturation) for crystallisation. This method is otherwise known as the allotropic change method.

In the particular case of the growth of large single crystal diamonds, the seeds are generally somewhat larger to allow the seeds to be oriented crystallographically, and thus promote the growth of the diamond in a preferred crystallographic direction. In the special case of the growth of single crystal diamonds with a plate habit, seeds with macroscopic multiple twin planes are selected and appropriately oriented to allow crystal growth to occur in the preferred crystallographic direction as taught by European Patent Publication No. 0 780 153 (1997). In these methods of growing diamond crystals, the difference in solubility between diamond at two different temperatures and substantially the same pressure is used as the driving force for crystallisation. This method is otherwise known as the temperature gradient method.

SUMMARY OF THE INVENTION

According to the present invention, a diamond cluster comprises a core and an overgrown region containing a plurality of diamond crystallites extending outwards from the core, the majority of the crystallites having a cross-sectional area which increases as the distance of the crystallite from the core increases. Generally, at least 80% of the crystallites have a cross-sectional area which increases as the distance of the crystallite from the core increases.

The diamond crystallites will generally have a low concentration of inclusions such as metal inclusions and preferably less than 1% mass of inclusions.

The external surfaces of the diamond crystallites will generally be well defined crystallographically surfaces.

The core preferably comprises a bonded mass of constituent diamond particles.

The size of the diamond clusters which are crystalline can vary over a wide range, but will typically have a size in the range 50 microns to 1 mm.

Further according to the present invention, a method of producing a plurality of diamond clusters includes the steps of providing a source of carbon, providing a plurality of growth center particles, each comprising a bonded mass of constituent particles, producing a reaction mass by bringing the carbon source and growth center particles into contact with a solvent/catalyst, subjecting the reaction mass to conditions of elevated temperature and pressure suitable for crystal growth, and recovering a plurality of diamond clusters from the reaction mass.

The, growth center particle will provide a number of randomly oriented nucleation sites by virtue of its structure and the initial crystals that grow will exhibit a variety of crystallographic directions depending upon the growth center's structure. Some of these crystals will be oriented so that they grow in the fastest growing direction, whilst other crystals will grow more slowly. Depending upon the number of nucleating sites in the growth center, the degree of interference of adjacent growing crystals and their growth directions, the growth of some crystals will be terminated early whilst others will continue growing. This will result in a crystal cluster whose structure is related to the structure of the original growth center particle. Furthermore, when the constituent particles comprising the growth center particle have multiple twin planes, the resultant grown crystal cluster will comprise crystallographically twinned crystals. Moreover, the twinning structure of the growth center particle may contribute to faster growth in particular crystallographic directions and so play a role in the selection of terminated crystals and those that continue to grow.

Thus, it has been found that the method of the invention produces clusters of diamond crystals, with the number of crystals comprising the cluster ranging from a few crystals (less than ten) to several hundreds of crystals. The crystals are generally substantially faceted and the clusters are substantially free of solvent/catalyst. Such clusters may be made up predominantly of single crystals, or predominantly of twinned crystals.

It is possible by appropriate selection of the growth center particles to produce clusters of selected and controlled or tailored structure. These clusters may be used in abrasive particle applications such as grinding, sawing, cutting, turning, milling, boring or polishing.

DESCRIPTION OF EMBODIMENTS

Figure 1:
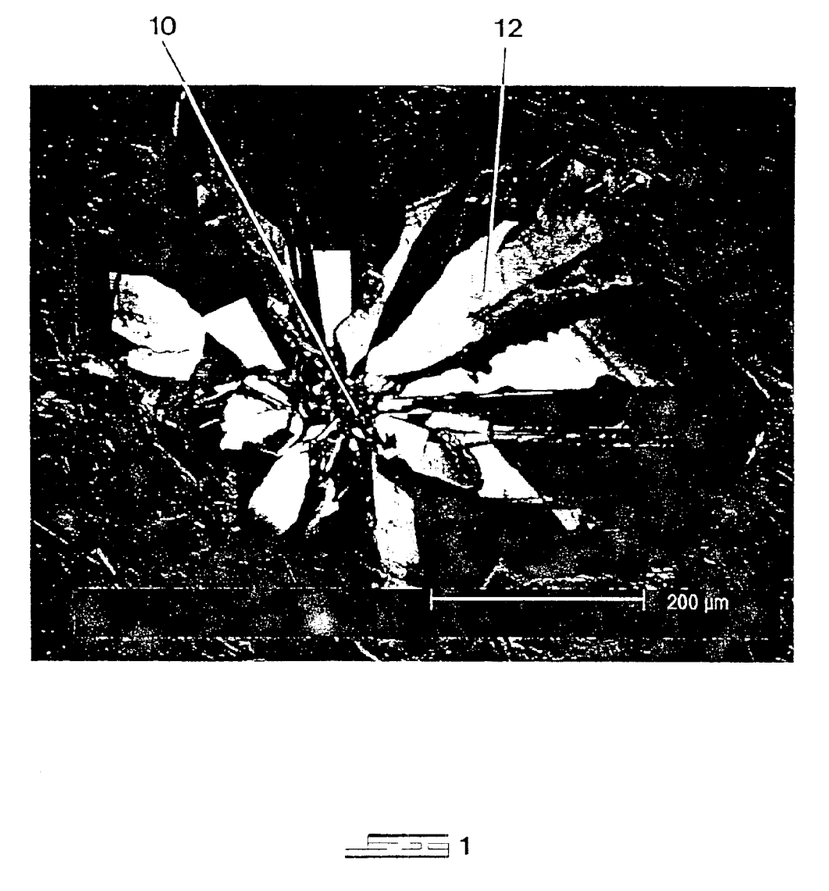
FIG. 1 is a photograph at approximately 200× magnification of a section of a diamond cluster taken using mixed secondary electron emission and cathodoluminescence.

An example of a diamond cluster of the invention is illustrated by the attached FIG. 1. Referring to this figure, it can be seen that diamond crystallites 12, forming a growth zone, radiate from the growth center or core 10. Further, the cross-sectional area of the crystallites 12 increase as the distance of the crystallite from the core 10 increases.

Figure 2:
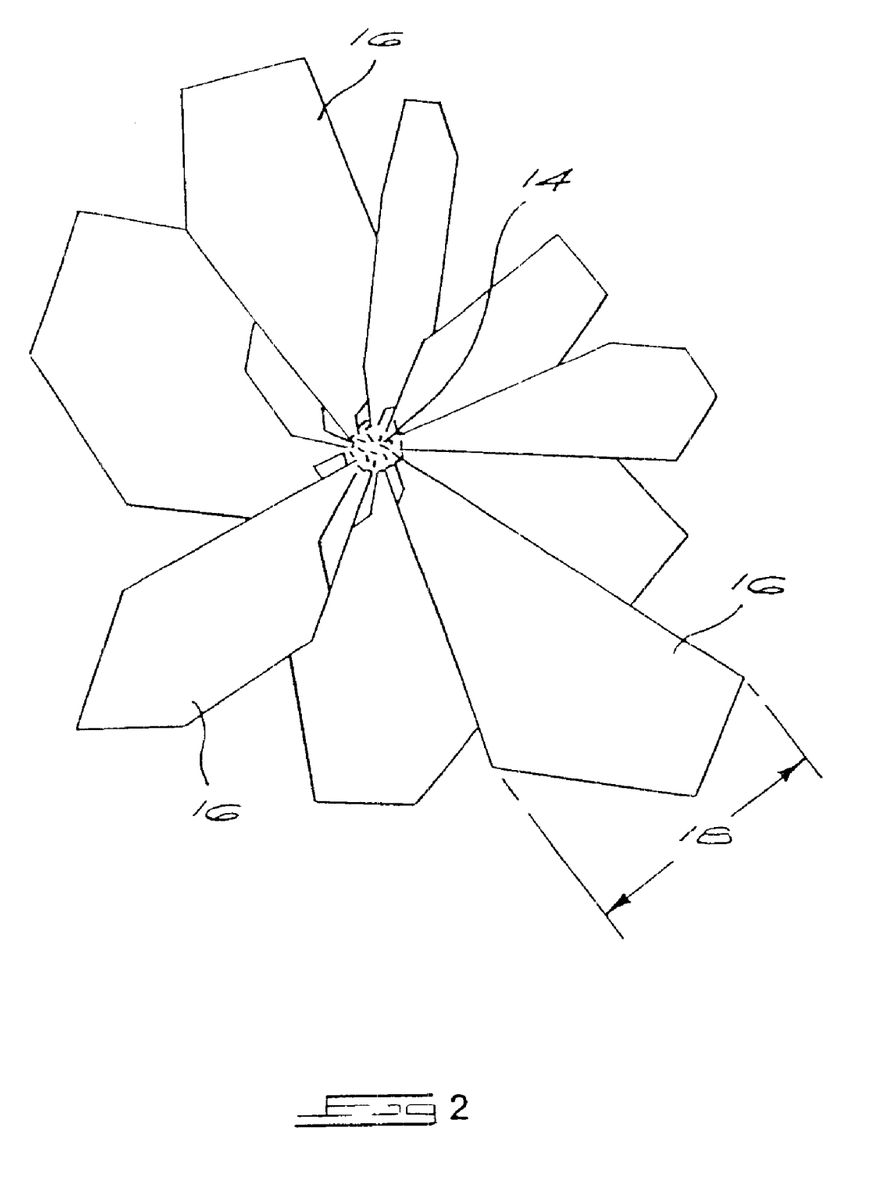
FIG. 2 is a schematic illustration of a cross-section of an example of a diamond cluster of the invention.

FIG. 2 is a diagrammatic illustration of an example of a diamond cluster of the invention. The cluster comprises a core growth center 14 having an overgrown region 16. The overgrown region 16 contains a plurality of diamond crystallites 16 which extend outwards from the core 14. The cross-sectional area 18 of most of the crystallites 16 increases as the distance of the crystallite 16 from the core 14 increases.

Figure 4:
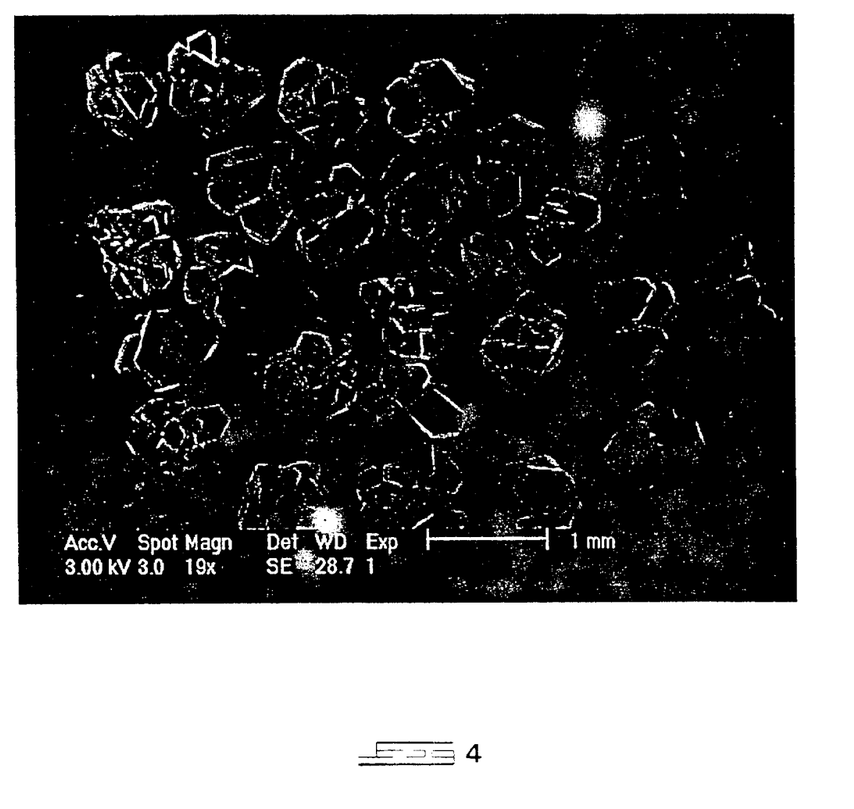
FIG. 4 is a photograph at approximately 23× magnification of a selection of diamond clusters.

FIG. 4 is a photograph at approximately 23× magnification of a selection of diamond clusters showing the open and closed structures as well as structures which comprise predominantly twinned crystals with a dominant cubo-octahedral morphology. The external surfaces of the diamond crystallites being well-defined crystallographic surfaces can also be seen.

The diamond clusters are produced by a method which provides a source of carbon and a plurality of growth center particles, each growth center particle comprising a bonded mass of constituent particles, producing a reaction mass by bringing the carbon source and the growth center particles into contact with a solvent/catalyst, subjecting the reaction mass to conditions of elevated temperature and pressure suitable for crystal growth and recovering a plurality of the diamond clusters, as discrete entities, from the reaction mass.

The carbon source may be graphite, HPHT (high pressure high temperature) synthetic diamond, chemical vapour deposited (CVD) diamond or natural diamond, or a combination of two or more thereof or other carbon sources known in the art.

The constituent particles for the growth center particles will generally be diamond and may be derived from HPHT synthetic diamond, CVD diamond, polycrystalline diamond (PCD), including thermally stable versions, shock-wave diamond or natural diamond. Growth center particles being a bonded mass of particles provide a multiplicity of nucleation sites, the number of which are controlled by the selection of a suitable combination of constituent particle size range and growth center size range. The constituent particles of the growth center may be randomly oriented crystallographically. The constituent particles may be of any suitable size, but typically, will have a size of less than 200 microns, e.g. sub-micron to 100 microns. The growth center particles may be of any size, but typically, will have a size less than 1 millimetre.

Growth center particles may be approximately equiaxed, or may possess an aspect ratio, that is a ratio of the largest dimension to the smallest dimension which is significantly greater than 1.

The bonding in the growth center particles is such as to create a relationship, generally a predetermined relationship, between individual constituent particles. The bonding may be self-bonding between constituent particles or by means of a bonding agent which may be organic or inorganic. A bonding agent should have sufficient strength to maintain the integrity of the growth center particle until the reaction mass has been formed and should not interfere with the growth of diamond crystal clusters.

Growth center particles of polycrystalline diamond (PCD), including thermally stable PCD, may be provided by selecting a PCD of suitable grain size, and crushing or otherwise cutting to a suitable size range. Growth center particles of this type will contain a multiplicity of constituent particles (grains). Growth center particles of this type may be treated to remove solvent/catalyst material. Similarly, growth center particles of a polycrystalline type may be provided by crushing or cutting up CVD diamond.

Growth center particles from HPHT diamond may be provided by selecting a suitable size fraction of diamond, granulating the diamond using a suitable bonding agent, and screening a suitable size range of growth center particles by a suitable sizing technique, such as sieving. Growth center particles of this type may consist of a multiplicity of single crystal constituent particles, substantially free of twin planes.

Growth center particles of natural diamond may be produced by selecting a suitable size fraction of diamond, granulating the diamond using a suitable bonding agent, and screening a suitable size range of growth center particles by a suitable sizing technique, such as sieving. Growth center particles of this type may contain a multiplicity of constituent particles containing single or twinned crystals depending on the nature of the natural diamond source. Growth center particles of natural diamond may also be provided by natural polycrystals or clusters or the like.

The constituent particles of the growth center may have any particle size distribution, and may be unimodal, bimodal or multimodal.

Solvent/catalysts for diamond are known in the art. Examples of such solvent/catalysts are transition metal elements such as iron, cobalt, nickel, manganese and alloys containing these metals, stainless steels, superalloys (e.g. cobalt, nickel and iron-based), bronzes (including cobalt-containing bronzes) and brazes such as nickel/phosphorus and nickel/chromium/phosphorus and nickel/palladium. Other suitable solvent/catalysts for diamond are elements, compounds and alloys not containing transition metals, e.g. copper, copper/aluminium and phosphorus, and non-metallic materials or a mixture thereof such as alkaline, alkaline earth, transition, metal hydroxides, carbonates, sulphates, chlorates, silicates (such as forsterite and enstatite) and other non-metallic catalysts known in the art.

The source of carbon and the growth center particles are brought into contact with a suitable solvent/catalyst to create a reaction mass. Generally, the source of carbon and the growth center particles will be mixed with the solvent/catalyst in particulate form. There must be sufficient carbon source to create a supersaturation of carbon in the solvent/catalyst and provide for growth of the diamond crystal clusters to the desired size.

Crystallisation and crystal structure modifiers known in the art, such as nitrogen, boron or phosphorus may be introduced into the reaction mass to achieve specific objectives.

The reaction mass may be placed in a reaction capsule which is placed in the reaction zone of a high temperature/high pressure apparatus and the contents then subjected to the desired elevated conditions of temperature and pressure. The source of carbon dissolves and the solute migrates to a surface of the growth center particles and precipitates or grows thereon. The diamond crystal clusters which are produced will have a morphology and predominance of single crystals or crystallographic twins depending on the saturation-time profile utilised, as well as the temperature and pressure conditions, the chemical composition of the solvent/catalyst, and the crystallographic structure of the constituent particles of the growth center particles.

The conditions of elevated temperature and pressure which are used in the method may be those under which diamond is thermodynamically stable. These conditions are well known in the art. Generally, the elevated temperature will be in the range 1000 to 2200° C., and the elevated pressure will be in the range 4 to 8 GPa. These conditions of elevated temperature and elevated pressure are maintained for sufficient time to allow the diamond crystal cluster to grow to the desired size. The time will be generally greater than 5 minutes and can be several hours.

It is also possible to produce diamond growth under conditions which are outside the region of thermodynamic stability of diamond. Conditions of temperature and pressure outside the region of thermodynamic stability of diamond can be used if the Ostwald rule dominates the growth process rather than the Ostwald-Volmer rule (see S Bohr, R Haubner and B Lux Diamond and Related Materials volume 4, pages 714–719, 1995)—"According to the Ostwald rule, if energy is withdrawn from a system with several energy states, the system will not reach the stable ground state directly, but instead will gradually pass through all intermediate stages. In addition, according to the Ostwald-Volmer rule, the less dense phase is formed (nucleated) first. Where the two rules would appear to contradict each other, the Ostwald-Volmer rule has priority over the Ostwald rule." In the case of diamond crystal growth outside its region of thermodynamic stability, the Ostwald-Volmer rule, can be suppressed by, for example, the application of pressure, thus allowing the growth of diamond on pre-existing diamond particles, provided graphite crystals are substantially absent.

Isothermal and isobaric conditions are preferred in the method of this invention. However, other methods of generating a carbon supersaturation, such as the temperature gradient method and size dependent supersaturation, may be used.

Recovery of the diamond clusters, as discrete entities, from the reaction mass may be carried out by methods well known in the art, e.g. by dissolving the solvent/catalyst using a strong inorganic acid.

The diamond cluster may be coated with an appropriate layer or layers, either in situ during the growth process, or after recovery.

The invention is illustrated by the following Examples.

EXAMPLE 1

Figure 3:
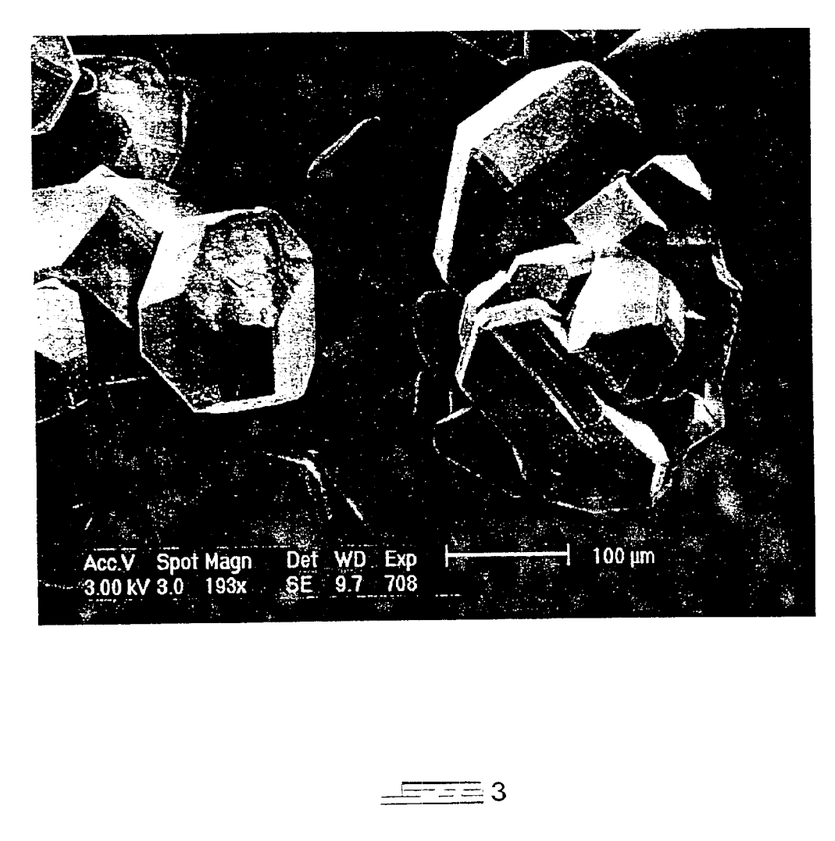
FIG. 3 is a photograph at approximately 160× magnification of a diamond cluster.

A reaction capsule was used to produce a plurality of diamond clusters. Growth center particles were made by crushing a piece of polycrystalline diamond (PCD), which had a nominal grain size of 4 microns, and screening the particles to produce a size fraction of less than 100 microns. A mixture was made using 0.2 grams of the growth center particles and a quantity of cobalt-iron-graphite powder. The mixture was placed in the reaction capsule and raised to conditions of about 1320° C. and about 5.5 GPa. These conditions were maintained for a period of 40 minutes. A plurality of diamond clusters were recovered from the reaction capsule by dissolving the cobalt-iron in dilute mineral acid. Examination of the recovered clusters showed them to be about 400 microns in overall size, and each cluster comprised about 15 constituent crystals. Some of the constituent crystals were twinned crystallographically, as shown in FIGS. 1 and 3.

EXAMPLE 2

A quantity of self-bonded growth center particles was made by crushing a sintered polycrystalline diamond compact with a nominal grain size of 75 microns and leaching the solvent/catalyst from the particles using a hot dilute mineral acid. After washing and drying, the growth center particles were screened to provide a mass of particles with a size range of 255 to 425 microns. A mixture was made of 0.99 grams of growth center particles and a quantity of a cobalt-iron-graphite powder mixture. The mixture was placed in a reaction capsule and raised to conditions of about 1320° C. and about 5.5 GPa. These conditions were maintained for a period of 120 minutes. The reaction capsule was dissolved in dilute mineral acid to remove the cobalt-iron. Examination of the recovered diamond clusters showed them to be 850 to 100 microns in overall size, with each cluster comprising about 15 to 20 crystals at the surface, ranging in size from about 250 microns to about 350 microns. The crystals at the surface of the clusters were predominantly twinned. The diamond clusters were substantially as shown in FIGS. 1 and 3.

EXAMPLES 3 to 8

Diamond clusters of the general type shown in FIGS. 1 and 3 have been made according to the process of Example 1, using other self-bonded growth center particles. Examples 3 to 8 are examples in which self-bonded growth center particles with a selection of constituent particle sizes have been used. In these Examples, the solvent/catalyst is cobalt-iron, the carbon source is graphite and the treatment conditions are about 1320° C. and about 5.4 GPa for various growth times. Examples 3 to 8 also show a range of nominal size ratios between the growth center particle and the constituent particles of the growth centres. In the table below, the term "Size ratio" refers to that ratio.

TABLE 1

| Example | Constituent particle size (microns) | Growth centre particle size (microns) | Size ratio | Growth time (mins) |
|---|---|---|---|---|
| 3 | 1 to 2 | 49 to 57 | 35.3 | 35 |
| 4 | 3 to 7 | 49 to 57 | 10.6 | 35 |
| 5 | 3 to 7 | 90 to 107 | 19.7 | 35 |
| 6 | 7 to 10 | 49 to 57 | 6.2 | 35 |
| 7 | 7 to 10 | 181 to 213 | 23.2 | 145 |
| 8 | 50 to 100 | 120 to 150 | 1.8 | 120 |

| Example | Observations |
|---|---|
| 3 | Predominantly twinned crystals, 150 to 200 μm. Clusters 450 to 600 μm. 15 to 25 surface crystals per cluster |
| 4 | Predominantly twinned crystals, 150 to 250 μm. Clusters 450 to 600 μm. 12 to 20 surface crystals per cluster |
| 5 | Predominantly twinned crystals, 150 to 250 μm. Clusters 350 to 550 μm. 12 to 20 surface crystals per cluster |
| 6 | Predominantly twinned crystals, 150 to 200 μm. Clusters 450 to 600 μm. 12 to 20 surface crystals per cluster |
| 7 | Predominantly twinned crystals, 100 to 300 μm. Clusters 700 to 1000 μm. 12 to 20 surface crystals per cluster |
| 8 | Predominantly twinned crystals, 150 to 250 μm. Clusters 500 to 700 μm. 4 to 12 surface crystals per cluster |

Figure 5:
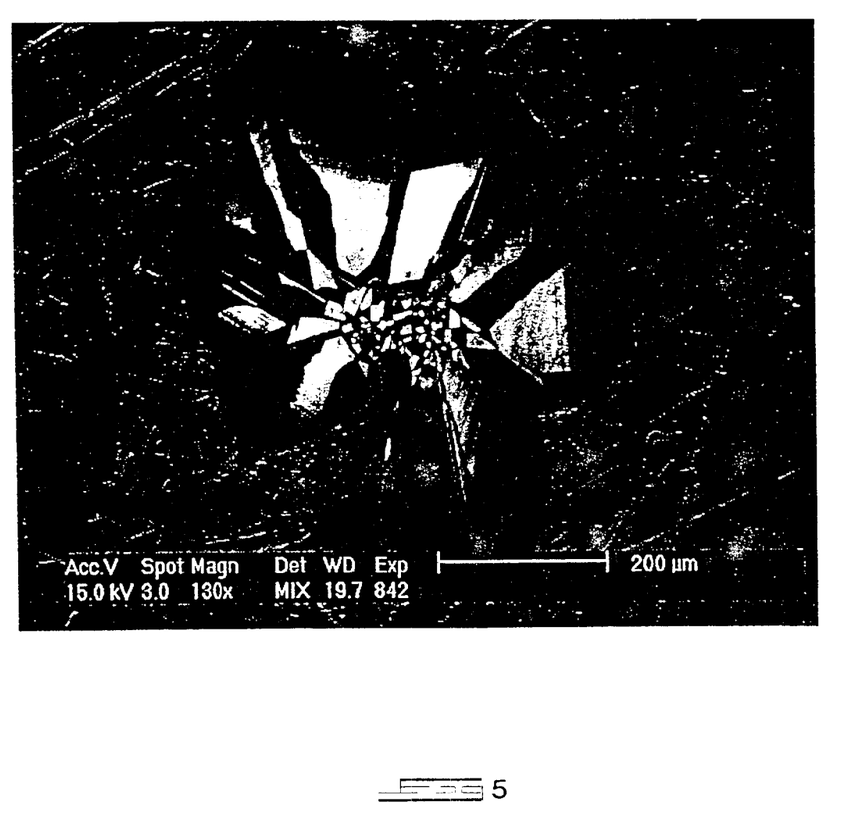
FIG. 5 is a photograph at approximately 200× magnification of a selection of another diamond cluster taken using secondary electron emission and cathodoluminescence.

Some clusters from Example 6 were mounted in a brass matrix and polished until the mid-plane of the clusters had been exposed. The structure of the clusters was examined by electron microscopy using both secondary electron emission and cathodoluminescence. A photograph of a typical cross-section is shown as FIG. 5. The photograph shows the radial growth morphology, characteristic of clusters, and the increase of both crystallite size and cross-section from the constituent particles of the growth center to the grown region of the cluster.

EXAMPLES 9 to 13

Growth center particles may be made by crushing and screening a mass of constituent diamond particles which have been bonded together using a bonding agent. The results of using a bonding agent to bond the constituent particles together to make a mass from which growth centres can be made are given in Examples 9 to 13. In these Examples, the solvent/catalyst is a cobalt-iron alloy, the source carbon is graphite and the conditions for diamond cluster growth are about 5.5 GPa at a variety of temperatures for various growth times.

TABLE 2

| Example | Constituent particle size range (microns) | Growth centre particle size range (microns) | Bonding agent | Temperature (° C.) | Growth time (mins) |
|---|---|---|---|---|---|
| 9 | 20 to 40 | 255 to 425 | starch | 1320 | 60 |
| 10 | 15 to 30 | 120 to 150 | sintered SiC | 1430 | 50 |
| 11 | 20 to 30 | 255 to 425 | NI powder | 1380 | 25 |
| 12 | 20 to 30 | 255 to 425 | Co powder | 1380 | 25 |
| 13 | 8 to 16 | 255 to 425 | Methyl cellulose | 1320 | 60 |

| Example | Observations |
|---|---|
| 9 | Predominantly twinned crystals, 120 to 260 $\mu$m. Clusters 400 to 600 $\mu$m. 15 to 30 surface crystals per cluster |
| 10 | Predominantly twinned crystals, 150 to 250 $\mu$m. Clusters 500 to 650 $\mu$m. 15 to 20 surface crystals per cluster |
| 11 | Both single and twinned crystals, 150 to 200 $\mu$m. Clusters 450 to 600 $\mu$m. 15 to 20 surface crystals per cluster |
| 12 | Predominantly twinned crystals, 50 to 100 $\mu$m. Clusters 500 to 1000 $\mu$m. More than 50 surface crystals per cluster |
| 13 | Mixture of twinned and single crystals, 120 to 200 $\mu$m. Clusters 700 to 850 $\mu$m. About 40 surface crystals per cluster |

EXAMPLE 14

A reaction capsule was made according to Example 1 using growth center particles made from shockwave diamond. The shockwave diamond particles had a size range of 7 to 10 microns and a constituent particle size of 0.04 microns, as determined from x-ray line broadening measurements, and a size ratio of about 200. The reaction capsule was subjected to conditions of about 5.4 GPa and about 1320° C. for 7 minutes. The recovered diamond clusters were about 350 to 450 microns across, and had 10 to 15 crystals, 100 to 200 microns in size, at the surface. The surface crystals were predominantly twinned.

In addition to showing the range of constituent particle sizes (from nominally 0.04 microns to nominally 75 microns) and methods of bonding the constituent particles to form growth centres, Examples 3 to 14 also illustrate the range of growth center particle sizes (from nominally 8 microns to nominally 400 microns) which can be used in the practice of this invention. In all cases, the clusters were essentially as shown in FIGS. 1 and 3.

EXAMPLE 15

Growth center particles were made by screening the 49 to 75 microns size fraction from a mass of self-bonded diamond particles made from a mixture of 70% diamond with a size range of 10 to 20 microns, and 30% diamond with a particle size range of 1 to 2 microns. A reaction capsule containing a quantity of growth center particles dispersed in a cobalt-iron-graphite powder mixture was treated at about 1320° C. and about 5.4 GPa for 7 minutes. The diamond clusters grown in this way were about 250 to 350 microns overall size, and comprised predominantly twinned crystals, about 75 to 150 microns, with about 12 crystals at the diamond cluster surface.

EXAMPLES 16 to 20

In Examples 1 to 15, the solvent/catalyst was a cobalt-iron alloy. In Examples 16 to 20, diamond clusters, substantially the same as illustrated in FIGS. 1 and 3, have been made according to Example 1, but with alternative solvent/catalysts and self-bonded growth center particles with a size range 90 to 107 microns. In all Examples, the carbon source was graphite.

TABLE 3

| Example | Solvent/catalyst | Temperature (° C.) | Pressure (GPa) | Time (mins) |
|---|---|---|---|---|
| 16 | Fe—Ni | 1420 | 5.5 | 45 |
| 17 | Mn—Ni | 1320 | 5.3 | 45 |
| 18 | Ni—P | 1080 | 4.7 | 35 |
| 19 | Ni—Cr—P | 1080 | 4.7 | 35 |
| 20 | Co—Fe—Ni | 1420 | 5.4 | 20 |

| Example | Observations |
|---|---|
| 16 | Predominantly twinned crystals, 150 to 250 $\mu$m. Clusters 450 to 600 $\mu$m. 5 to 15 surface crystals per cluster |
| 17 | Predominantly twinned crystals, 50 to 100 $\mu$m. Clusters 150 to 300 $\mu$m. 10 to 15 surface crystals per cluster |
| 18 | Predominantly single crystals, 80 to 150 $\mu$m. Clusters 250 to 350 $\mu$m. 7 to 10 surface crystals per cluster |
| 19 | Predominantly twinned crystals, 50 to 120 $\mu$m. Clusters 150 to 250 $\mu$m. 10 to 15 surface crystals per cluster |
| 20 | Predominantly twinned crystals, 150 to 300 $\mu$m. Clusters 500 to 600 $\mu$m. 15 to 20 surface crystals per cluster |

EXAMPLE 21

A reaction volume was made by mixing 12 grams natural diamond with a size less than 0.5 microns with 68 grams cobalt-iron powder mixture and a quantity of self-bonded growth center particles with a size range of 90 to 107 microns and a constituent particle size of nominally 5 microns. The reaction volume was subjected to conditions of about 1320° C. and about 5.4 GPa for a growth time of about 2 hours. Examination of the recovered diamond clusters showed the surface crystals to be predominantly twinned with a size of 20 to 40 microns and to number in excess of a hundred. The diamond clusters ranged in size from about 300 to 500 microns.

EXAMPLE 22

A reaction volume was made of a mixture of graphite and diamond as the carbon source, mixed cobalt and iron powders as the solvent/catalyst, and a quantity of self-bonded growth centres with a particle size range of 90 to 107 microns. The reaction volume was placed in a high pressure apparatus and subjected to conditions of about 1420° C. and about 5.5 GPa for a period of about 40 minutes. Examination of the recovered clusters showed them to be 750 to 850 microns overall size with 15 to 25 surface diamond crystals, each about 250 to 350 microns equivalent diameter.

EXAMPLE 23

Figure 6:
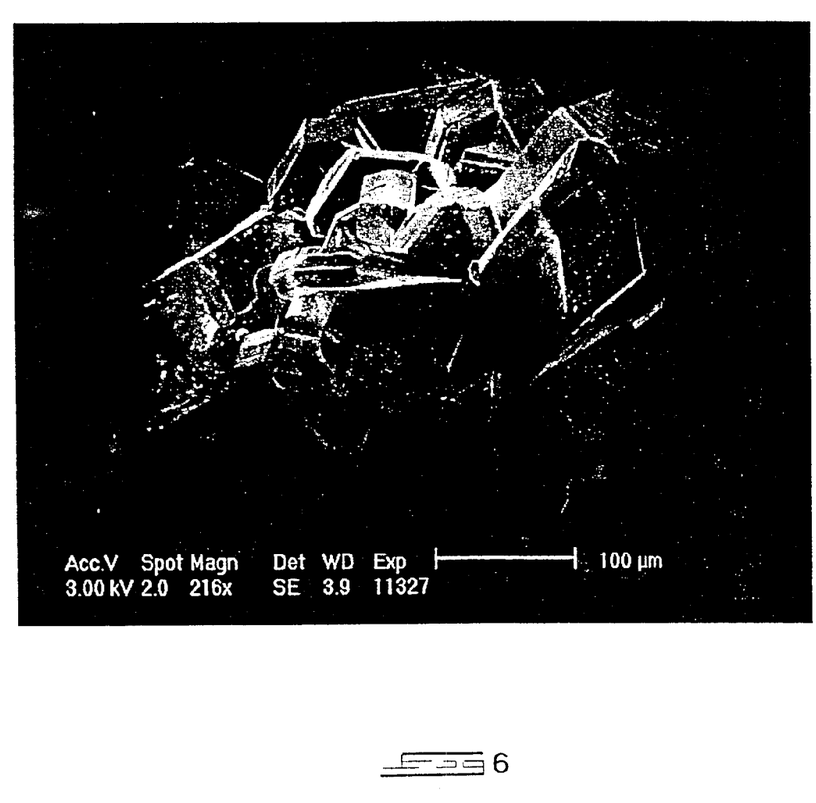
FIG. 6 is a photograph at approximately 270× magnification of a diamond cluster with a tabular and twinned morphology.

A reaction volume was made substantially according to Example 5, but with about 1% phosphorus added to the solvent/catalyst to modify the crystal growth morphology. The reaction volume was treated at about 1420° C. and about 5.5 GPa for two hours. Examination of the recovered clusters showed the morphology to be tabular rather than cubo-octahedral. Furthermore, the crystals were more highly twinned than in Example 5. These clusters were substantially as shown in FIG. 6.

EXAMPLE 24

An experiment was conducted to compare diamond clusters with cubo-octahedral single crystal diamonds with respect to retention and wear in a metal bond. A test-piece was made using equal amounts of each diamond type sintered into a cobalt-based metal matrix. A grinding wheel was made from Norite, a class 2 granite, and mounted on a standard surface grinding machine. The test-pieces were clamped adjacent to each other on the table of the surface grinder to allow simultaneous testing. The grinding machine was set to a downfeed of 5 microns per pass, a peripheral grinding wheel speed of 15 metres per second and a table speed of 2.5 m/min. The samples were plunge ground in both the forward and reverse directions, and without any crossfeed. The behaviour of both test-pieces was assessed at intervals until a substantial quantity of granite had been removed from the wheel, at which time the test was terminated. The pull-out of the cubo-octahedral single crystals steadily increased throughout the test to reach 30% at its conclusion. The test-piece containing the diamond clusters showed 2% pull-out at the end of the exercise. Using normal wear progression categorisation criteria at the conclusion of the test, the analysis showed that for the cubo-octahedral single crystals 30% had pulled out, 46% were in the working condition and the balance of 24% were either emerging or rough. For the diamond clusters, the categorisation was 2% pulled out, 68% working, and 30% either emerging or rough. The diamond clusters thus showed a significant improvement compared with single crystal cubo-octahedral diamonds with respect to retention in the bond, and with respect to the proportion of working entities.

What is claimed is:

1. A diamond cluster comprising a core and an overgrown region containing a plurality of diamond crystallites extending outwards from the core, the majority of the crystallites having a cross-sectional area which increases as the distance of the crystallite from the core increases as the distance of the crystallite from the core increases.

2. A diamond cluster according to claim 1 wherein at least 80% of the crystallites have a cross-sectional area which increases as the distance of the crystallite from the core increases.

3. A diamond cluster according to claim 1 wherein the diamond crystallites have a low concentration of inclusions.

4. A diamond cluster according to claim 3 wherein the diamond crystallites have less than 1% by mass of inclusions.

5. A diamond cluster according to claim 1 wherein the external surfaces of the diamond crystallites are well-defined crystallographic surfaces.

6. A diamond cluster according to claim 1 wherein the core comprises a bonded mass of constituent diamond particles.

7. A diamond cluster according to claim 1 which has a size in the range 50 microns to 1 mm.

8. A method of producing a plurality of diamond clusters includes the steps of providing a source of carbon, providing a plurality of growth center particles, each growth center particle comprising a bonded mass of constituent particles, producing a reaction mass by bringing the carbon source and growth center particles into contact with a solvent/catalyst, subjecting the reaction mass to conditions of elevated temperatures and pressure suitable for crystal growth, and recovering a plurality of diamond clusters from the reaction mass.

9. A method according to claim 8 wherein the carbon source is selected from graphite, HPHT synthetic diamond, CVD diamond, natural diamond and a combination of two or more thereof.

10. A method according to claim 8 wherein the constituent particles of the growth center particles are diamond.

11. A method according to claim 10 wherein the diamond for the growth center particles is selected from HPHT synthetic diamond, CVD diamond, polycrystalline diamond, natural diamond and a combination of two or more thereof.

12. A method according to claim 8 wherein the constituent particles have a size less than 200 microns.

13. A method according to claim 8 wherein the constituent particles have a size in the range of 100 microns.

14. A method according to claim 8 wherein the growth center particles have a size of less than 1 mm.

15. A method according to claim 8 wherein the bonding in the growth center particles is achieved by self-bonding between constituent particles.

16. A method according to claim 8 wherein bonding between constituent particles in the growth center particles is achieved by means of a bonding agent.

17. A method according to claim 8 wherein the elevated temperature is in a range of 1000 to 2200° C. and the elevated pressure is in a range of 4 to 8 GPa.

* * * * *